United States Patent Office 3,323,203
Patented June 6, 1967

3,323,203
FRICTION WELDING
Milton Bernard Hollander, Stamford, William Earl McKinley, Springdale, and Joseph Chin Jung Cheng, Norwalk, Conn., assignors to American Machine & Foundry Company, a corporation of New Jersey
Filed Mar. 25, 1964, Ser. No. 354,747
6 Claims. (Cl. 29—470.3)

This invention relates in general to the friction welding of metals and, more particularly, to the friction welding of zirconium alloys to stainless steel alloys.

Friction welding consists of joining two workpieces by rapidly rotating the workpieces relative to each other, forcing the rapidly rotating workpieces together to generate heat in the area of contact or the weld area, either allowing the relative rotation of the workpieces to come to a stop as energy of rotation is delivered to the weld area or otherwise rapidly stopping the relative rotation of the workpieces, and continuing to force the workpieces together to complete a friction weld.

Zircaloy-2 and Zircaloy-4 are particular alloys of zirconium containing tin, iron, chromium, and nickel. Zircaloy-2 contains 1.5% Sn, 0.12% Fe, 0.10% Cr, and 0.05% Ni with the remainder zirconium. Zircaloy-4 contains 1.5% Sn, 0.20% Fe, and 0.10% Cr and the remainder zirconium.

In some structural applications it is desirable to weld zirconium alloy workpieces to stainless steel alloy workpieces. As one example, type 304 stainless steel containing 1% or more boron may be used to moderate radiation in extreme environments. Such a stainless steel element is often mounted onto a Zircaloy-4 base.

It is, therefore, a main object of this invention to provide a method for friction welding zirconium-alloys to stainless steel alloys.

Another object of this invention is to provide a method of friction welding Zircaloy-2 and Zircaloy-4 to stainless steel containing boron, the small heat affected area of the friction weld leaving the boron content of the stainless steel relatively unaffected.

Many other objects, advantages and features of invention reside in the particular process of this invention as will be understood from the following description and accompanying drawing wherein.

Figure 1:
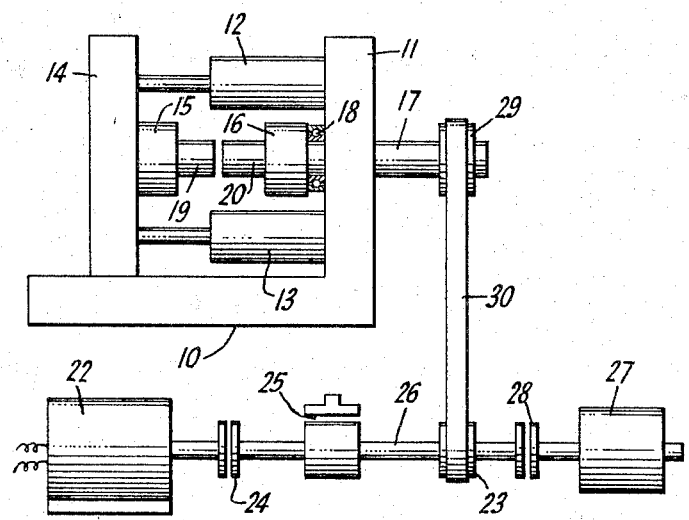
FIGURE 1 is a side view of a friction welding apparatus which may be used in the practice of this invention.

Referring to the drawing in detail, a base 10 has an upright member 11 extending therefrom. Two hydraulic cylinders 12 and 13 may be actuated to move the member 14 toward member 11. A stationary chuck 15 is fixed to member 14 so that it cannot rotate. A rotatably mounted chuck 16 is fixed to shaft 17 to rotate with it. A thrust bearing 18 is provided behind chuck 16. The workpieces 19 and 20 to be friction welded are held in the chucks 15 and 16. A motor 22 drives a pulley 23 through the clutch 24. A brake 25 is mounted on the shaft 26 to which the pulley 23 is secured. A flywheel mass 27 may be connected to pulley 23 by means of a clutch 28. Pulley 23 drives pulley 29 and thereby chuck 16 by means of a belt 30.

To conventionally friction weld a Zircaloy workpiece 20 to a stainless steel workpiece 19, if the workpieces are from .100 inch in diameter to .250 inch in diameter, the following parameters should be observed. The workpieces should be rotated relative to each other at a speed of over 600 r.p.m. This is accomplished by disengaging clutch 28 and brake 25 and engaging clutch 24 and starting motor 22. The hydraulic cylinders 12 and 13 are then actuated to force the relatively rotating workpieces together with a force of between 20,000 to 60,000 pounds per square inch for from one-half to three seconds. Clutch 24 is then disengaged and brake 25 applied to stop the relative rotation of the workpieces while the cylinders 12 and 13 continue to exert a forging pressure of between 20,000 to 60,000 pounds per square inch.

Figure 2:
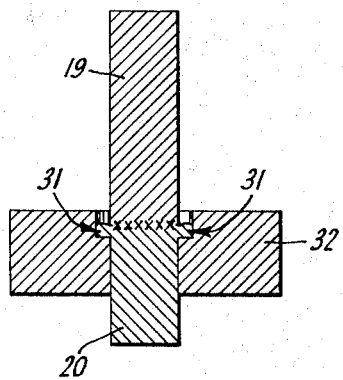
FIGURE 2 is a longitudinal section through friction welded zirconium alloy and stainless steel workpieces with an upset retaining collar in place.
Figure 3:
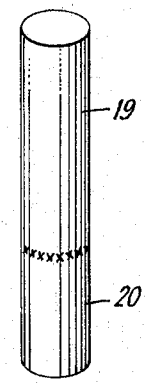
FIGURE 3 is a perspective view of two welded workpieces after machining off upset.

As shown in FIGURES 2 and 3, a Zircaloy-4 cap 20 is friction welded on a 304 stainless steel body 19 containing about 1% boron. During this friction welding, either of the workpieces 19 or 20 may be rotated in chuck 16. Also, during the friction welding considerably more upset will flow from the Zircaloy-4 workpiece 20 than from the stainless steel workpiece 19. This upset 31, as may be seen in FIGURE 2, may be contained and limited by means of a retaining collar 32. When the upset is machined from the welded workpieces, they appear as shown in FIGURE 3.

Since the friction weld of this invention is accomplished in less than three seconds, the heat affected zone surrounding the weld is not large. Thus the boron in the stainless steel does not diffuse into the Zircaloy-4 or out of the stainless steel workpiece and practically no intermetallics are formed at the weld interface.

The workpieces 19 and 20 may be inertia friction welded by engaging clutches 24 and 28 and releasing brake 25. Motor 22 may then rotate chuck 16 with the large flywheel mass 27. The cylinders 12 and 13 are then actuated to force the workpieces 19 and 20 together with a force of between 20,000 to 60,000 pounds per square inch of weld area. As the relatively rotating workpieces 19 and 20 are forced together, the rotational inertia or the flywheel mass 27, chuck 16, and shaft 17 discharges between 6,000 ft.-lbs. and 54,000 ft.-lbs. of energy to the weld area for each square inch of weld area in less than three seconds.

While this invention has been described in the best form known, it will nevertheless be understood that this is purely exemplary and that modifications may be made without departing from the spirit of the invention except as it may be more limited in the appended claims wherein.

What is claimed is:

1. The process of friction welding zirconium alloy and stainless steel workpieces comprising the steps of rotating the workpieces relative to each other while forcing the workpieces together with a force of between 20,000 to 60,000 pounds per square inch of weld area for from one-half to three seconds, and rapidly stopping the relative rotation of the workpieces while continuing to force them together with a force of between 20,000 to 60,000 pounds per square inch of weld area.

2. The process of friction welding zirconium alloy and stainless steel workpieces comprising the steps of rotating the workpieces relative to each other while forcing the workpieces together with a force of between 20,000 to 60,000 pounds per square inch of weld area to deliver over 6,000 ft.-lbs. of energy to the weld area per square inch of weld area in less than three seconds, and rapidly stopping the relative rotation of the workpieces while continuing to force them together with a force of between 20,000 to 60,000 pounds per square inch of weld area.

3. The process of friction welding zirconium alloy and stainless steel workwpieces between .10 and .25 inch in diameter comprising the steps of rotating the workpieces relative to each other over 600 revolutions per minute while forcing the workpieces together with a force of between 20,000 to 60,000 pounds per square inch of weld area for less than three seconds, and rapidly stopping the relative rotation of the workpieces while continuing to force them together with a force of between 20,000 to 60,000 pounds per square inch of weld area.

4. The process according to claim 3 with the additional step of placing an upset controlling collar about the weld area prior to friction welding the workpieces.

5. The process of friction welding zirconium alloy and stainless steel workpieces comprising the steps of rotating the workpieces relative to each other while forcing the workpieces together with a force of between 20,000 and 60,000 pounds per square inch of weld area for less than three seconds, and allowing the frictional drag between said workpieces to rapidly stop relative rotation of the workpieces while continuing to force them together with a force between 20,000 and 60,000 pounds per square inch of weld area.

6. The process according to claim 5 with the additional step of placing an upset controlling collar about the weld area prior to friction welding the workpieces.

References Cited

UNITED STATES PATENTS

| | | | |
|---|---|---|---|
| 3,134,278 | 5/1964 | Hollander et al. | 29—470.3 X |
| 3,235,312 | 2/1966 | Hollander | 29—490 X |

JOHN F. CAMPBELL, *Primary Examiner.*